(12) United States Patent
Bochud et al.

(10) Patent No.: US 9,079,120 B2
(45) Date of Patent: Jul. 14, 2015

(54) METHOD AND SYSTEM FOR CONTROLLING LIQUID LEVELS

(75) Inventors: Michel Bochud, La Pocatiere (CA); David Bedard, Inverness (CA); Gilles Lamontagne, St-Jacques le Majeur (CA)

(73) Assignee: TOLE INOX INC., Princeville (CA)

( * ) Notice: Subject to any disclaimer, the term of this patent is extended or adjusted under 35 U.S.C. 154(b) by 726 days.

(21) Appl. No.: 13/408,469

(22) Filed: Feb. 29, 2012

(65) Prior Publication Data

US 2012/0227734 A1 Sep. 13, 2012

Related U.S. Application Data

(60) Provisional application No. 61/451,653, filed on Mar. 11, 2011.

(51) Int. Cl.
*B01D 1/30* (2006.01)
*B01D 1/14* (2006.01)
*C13B 25/00* (2011.01)
*C13B 25/02* (2011.01)
*C13B 25/06* (2011.01)
*B01D 1/00* (2006.01)

(52) U.S. Cl.
CPC . *B01D 1/30* (2013.01); *C13B 25/00* (2013.01); *C13B 25/001* (2013.01); *C13B 25/02* (2013.01); *C13B 25/06* (2013.01); *B01D 1/0076* (2013.01); *B01D 1/0082* (2013.01); *B01D 1/14* (2013.01)

(58) Field of Classification Search
CPC ...... B01D 1/30; B01D 1/0076; B01D 1/0082; B01D 1/14; C13B 25/00; C13B 25/001; C13B 25/02; C13B 25/06
See application file for complete search history.

(56) References Cited

U.S. PATENT DOCUMENTS

| | | | | |
|---|---|---|---|---|
| 4,953,538 A | * | 9/1990 | Richardson et al. | 127/9 |
| 5,275,666 A | * | 1/1994 | Goodrich et al. | 127/9 |
| 5,772,774 A | * | 6/1998 | Chabot | 127/2 |

* cited by examiner

*Primary Examiner* — David A Reifsnyder
(74) *Attorney, Agent, or Firm* — Goudreau Gage Dubuc; Gwendoline Bruneau

(57) ABSTRACT

A method and a system for regulating fluid levels in an evaporator comprising fluid communicating pans, the system comprising a tube in fluid communication with at least a first pan of the evaporator and exterior to the first pan, a level sensor immersed in the fluid in the tube; an air pump unit; and a pressure monitoring unit; the air pump unit providing a constant air airflow to the tube; the level sensor detecting variations of the fluid level in the tube, and the pressure monitoring unit controlling input of fluid into the first pan in response to the variations detected by the level sensor.

4 Claims, 4 Drawing Sheets

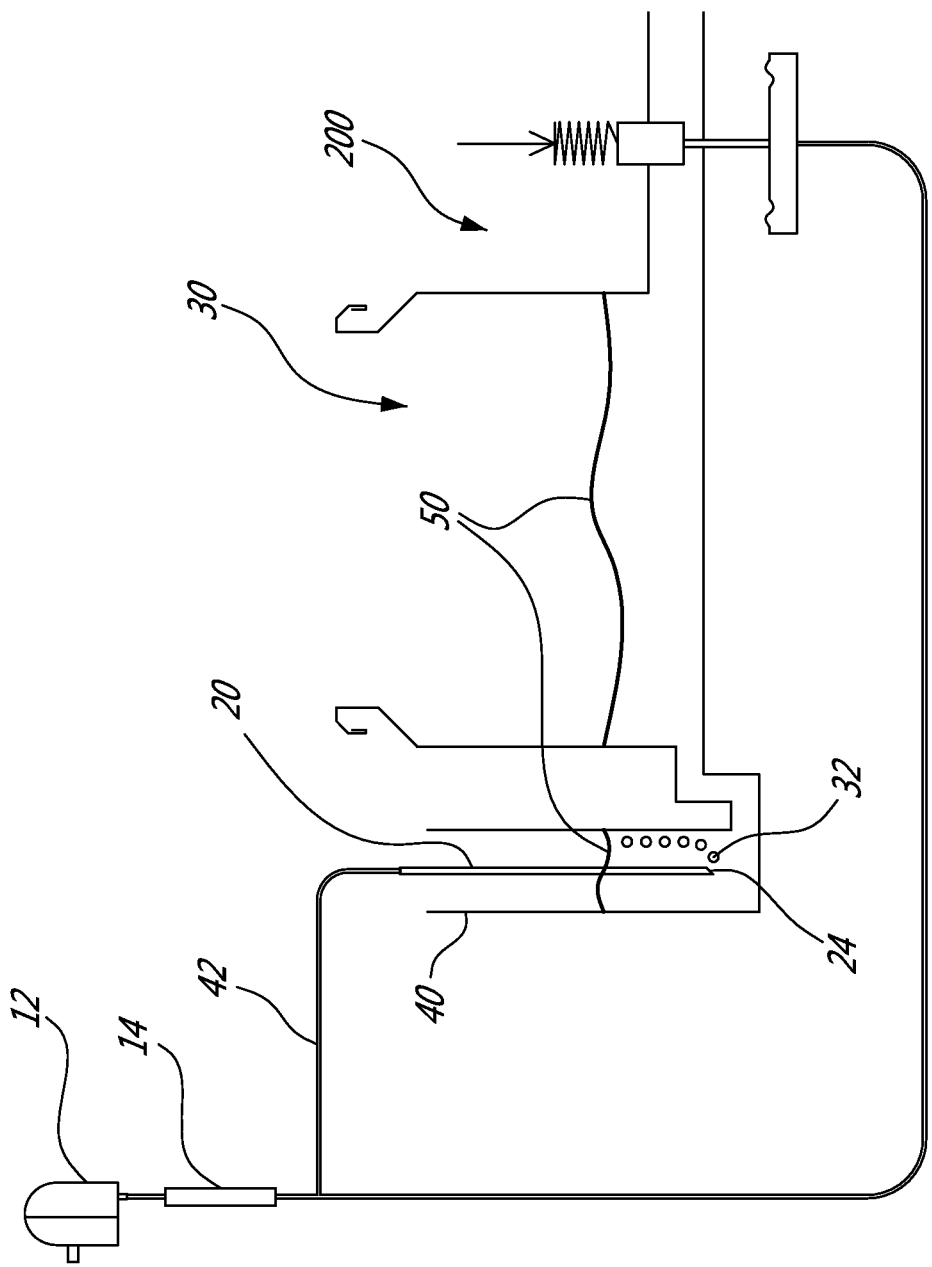

METHOD AND SYSTEM FOR CONTROLLING LIQUID LEVELS

CROSS REFERENCE TO RELATED APPLICATIONS

This application claims benefit, under 35 U.S.C. §119(e), of U.S. provisional application Ser. No. 61/451,653 filed on Mar. 11, 2011. All documents above are incorporated herein in their entirety by reference.

FIELD OF THE INVENTION

The present invention relates to controlling liquid levels. More specifically, the present invention is concerned with a method and system for controlling liquid levels in an evaporator.

BACKGROUND OF THE INVENTION

Maple water is transformed into maple syrup in an evaporator, in which the water is heated until it boils. From the time the maple water is poured into the evaporator to the time it turns into syrup, it undergoes a complex chain of chemical reactions which produce the characteristically "maple" colour and flavour.

The evaporator consists of pans that are placed over a firebox referred to as an arch. The pans are divided to separate the more concentrated water from the more dilute. The pans are not closed, so that the liquid can move freely as the water evaporates. The level of water in the pans is standardly regulated using a mechanical float and valve mechanism. However such mechanism is vulnerable to accumulation of sugar and calcium carbonate.

There is a need in the art for a method and a system for controlling liquid levels in evaporators.

SUMMARY OF THE INVENTION

More specifically, in accordance with the present invention, there is provided a system for regulating fluid levels in an evaporator comprising fluid communicating pans, the system comprising a tube, in fluid communication with at least a first pan of the evaporator and exterior to said first pan, a level sensor immersed in the fluid in the tube; an air pump unit; and a pressure monitoring unit; wherein the air pump unit provides a constant air airflow to the tube; the level sensor detecting variations of the fluid level in the tube, and the pressure monitoring unit controlling input of fluid into the first pan in response to the variations detected by the level sensor.

There is further provided a maple syrup evaporator, comprising at least a first and a second fluid communicating pans through which the maple water moves freely as water evaporates; a tube in fluid connection with the second pan and exterior to the second pan; a level sensor immersed in the fluid in the tube; an air pump unit; and a pressure monitoring unit; wherein the air pump unit provides a constant airflow to the tube; the level sensor detecting variations of the fluid level in the tube, and the pressure monitoring unit controlling input of maple water from the first pan into the second pan in response to the variations detected by the level sensor.

There is further provided a method for regulating a fluid level in a pan of an evaporator, comprising providing a tube, exterior to the pan and in fluid connection with the pan; immersing a level sensor in the tube; directing a controlled airflow to the tube; detecting variations of the fluid level in the tube; and controlling input of fluid into the pan in response to the variations detected by the level sensor.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 4 is a schematical view of a system according to another embodiment of an aspect of the present invention.

DESCRIPTION OF EMBODIMENTS OF THE INVENTION

A system according to an embodiment of an aspect of the present invention generally comprises an air pump unit, a level sensor, and pressure monitoring unit.

Figure 1:
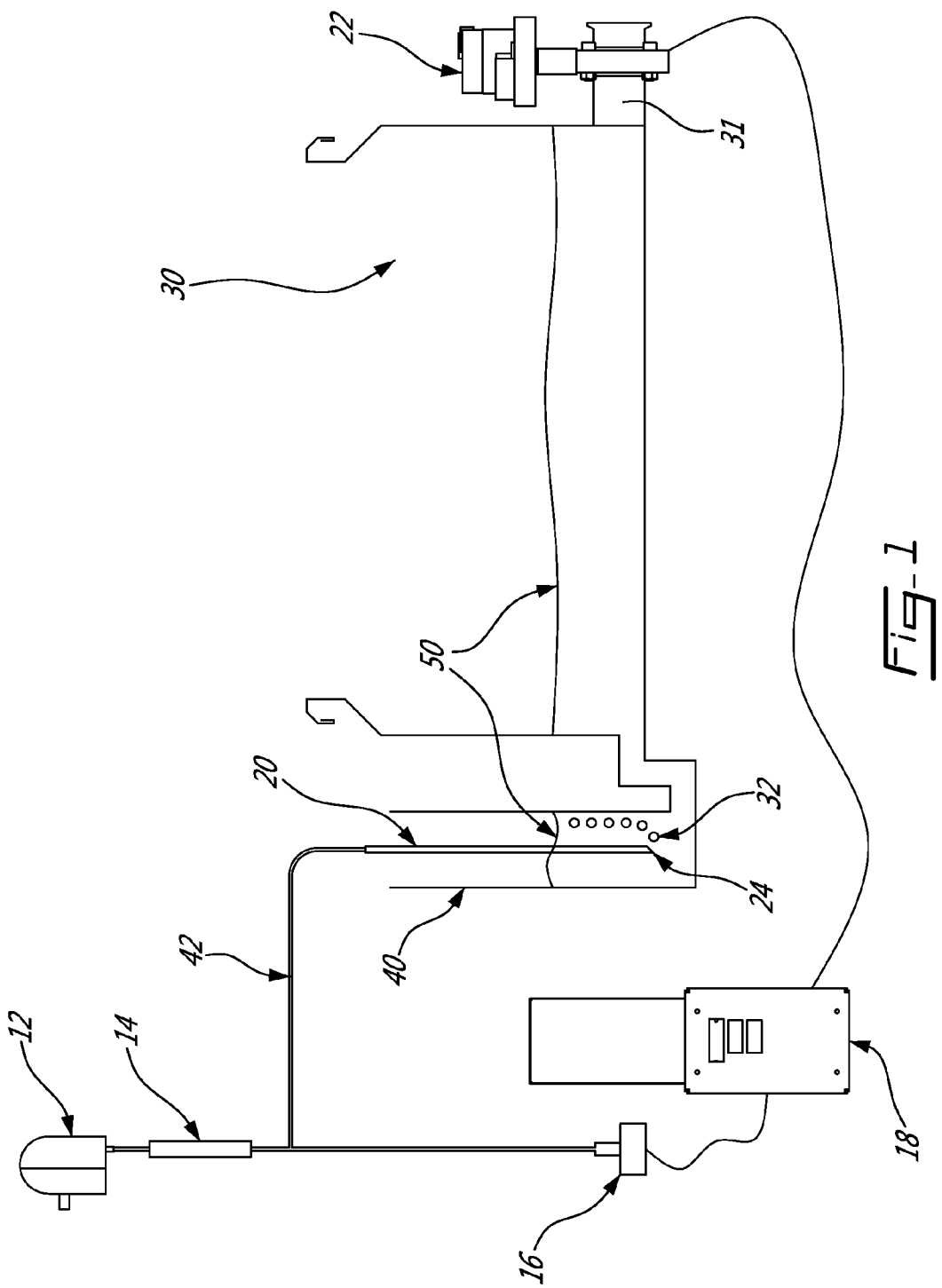
FIG. 1 is a schematical view of a system according to an embodiment of an aspect of the present invention.

In an embodiment illustrated for example in FIG. 1, the pressure monitoring unit comprises a pressure sensor 16, a controller 18 and a motorized valve 22.

The air pump unit comprises an air pump 12 and an air flow regulator 14. The airflow provided by the air pump 12 is controlled and adjusted by the air flow regulator 14, and directed by a tubing 42 to a side tube 40 of a reservoir 30 in which the liquid level 50 is to be monitored. The side tube 40 and the reservoir 30 are in fluid communication, so that they have the same liquid level 50.

The level sensor 20 may be a stainless steel small tubing located at the free end of the tubing 42 for example. The level sensor 20 is immersed in the liquid in the side tube 40 of the reservoir 30. As the air flow passes through the level sensor 20, bubbles 32 appear at the output 24 of the tubing 42. The level sensor 20 is immersed in the liquid so that the bubbles 32 reach down about one inch deep within the liquid in the side tube 40. On the one hand, care must be taken not to immerse the level sensor 20 too deep within the liquid in the side tube 40, in order to avoid errors due to variations in the density of the liquid, in the case of maple water for example. On the other hand, the level sensor 20 should be immersed deep enough to allow regulation of the fluid level over a desired range of levels. For a tubing 42 and a level sensor 20 of about ¼" in diameter for example, the side tube 40 may be chosen with an inner diameter of about ⅝" for example; a typical bubbling rate is of about one or two bubbles every second for example, and the pressure drop in the tubing 42 is not significant. If the air flow through the level sensor 20 is too high, a pressure drop in the tubing 42 may occur which may cause a difference between the pressure in the side tube 40 and the pressure as read by the pressure sensor 16. The pressure drop depends on the diameter and on the length of the tubing 42. Typically, the flow is regulated, with the air flow regulator 14, so as to generate 0.3 to 3 bubbles/sec. For a length of the tubing 42 of 2 meters, a minimum inner diameter of ¼ inch will be used to yield an error on the level lower than 1 mm.

The controller 18, such as an electronic board for example, receives the measures of pressure from the pressure sensor 16.

The pressure in the side tube 40 is equal to the height 50 of liquid therein. As the liquid level 50 rises or lowers, in both the reservoir 30 and the side tube 40 as detected by the lever sensor 20, the pressure of airflow lowers or rises correspondingly. The pressure sensor 16 detects these variations in the pressure of the airflow and sends this information to the controller 18, which in turn drives the valve 22 into either letting liquid in the reservoir 30 through inlet 31 as shown in FIG. 1 so as to raise the level 50 or stopping the liquid ingress in the reservoir 30.

Alternatively, a pneumatic diaphragm valve 200 may be used in place of the pressure sensor 16, the controller and the valve 22, as shown in FIG. 5. The accuracy of lever control is then dependent on the diaphragm surface. When the level to be controlled rises, the pressure in the tubing 42 increases, and this pressure increase acts on the diaphragm valve, causing it to open more widely so as to bring the level back to the desired level.

Figure 2:
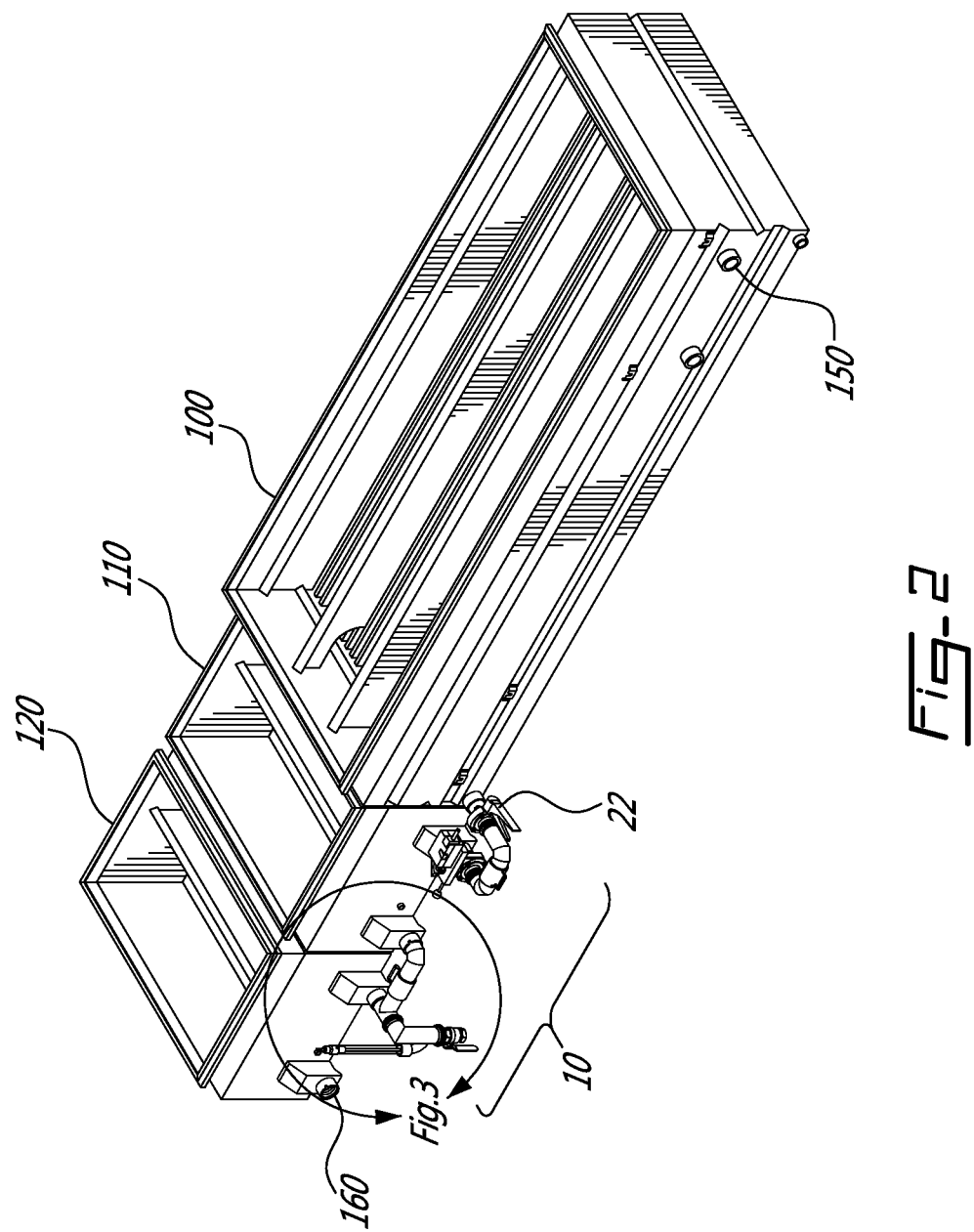
FIG. 2 is a perspective view of a maple syrup evaporator with a system according to an embodiment of an aspect of the present invention.

In a standard maple syrup evaporator, as shown in FIG. 2 for example, the pans are divided to separate the more concentrated water from the more dilute. The pans are in fluid communication, so that the liquid can move freely as the water evaporates. Typically, in the corrugated pan 100, the water level is about 8" while the water level is about 2" in the flat pans 110 and 120. The corrugated pan 100 receives the water first, through a water input 150, for concentration thereof. Then, the liquid is directed to the flat pans 110 and 120, where the syrup reaches its final concentration, during the so-called "finishing" stage, before it is delivered through output 160. The liquid level need be controlled at two points; in the corrugated pan 100 and in the flat pans 110.

Figure 3:
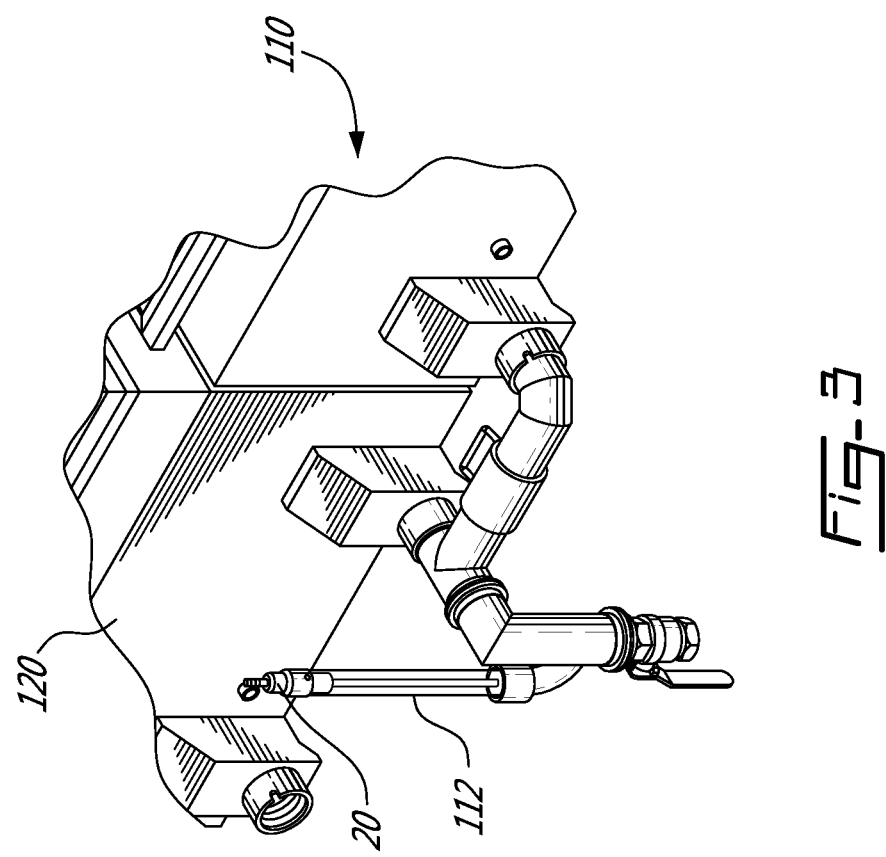
FIG. 3 is a detail of FIG. 2.

A system 10 as described hereinabove may thus be used to control the level of liquid between the corrugated pan 100 and the flat pans 110 and 120 for example. As shown in FIGS. 2 and 3, the liquid level is read between the flat pans 110 and 120, by the level sensor 20 in a glass tube 112 exterior to the pans 110 and 120 in order to avoid perturbations due the boiling of the liquid in the pans, and in fluid communication therewith as described hereinabove. The valve 22 is actuated so as to control the liquid level in the flat pans 110 and 120, by either letting liquid flowing into the flat pans 110 and 120 from the corrugated pan 100 so as to raise the level 50 or stopping the liquid ingress into the flat pans 110 and 120 from the corrugated pan 100.

As people in the art will appreciate, the present system and method allow controlling levels of liquids even in environments that are prone to perturbations in the level readings, for example due to the liquids boiling, and/or contamination, for example from sugar and calcium in the case of pans of a maple water evaporator.

Although the present invention has been described hereinabove by way of specific embodiments thereof, it can be modified, without departing from the spirit and nature of the subject invention as defined in the appended claims.

What is claimed is:

1. A system for regulating a level of a liquid in a pan having a liquid inlet, the system comprising:
   a tubing immersed in the liquid in said pan and having an open free end within the liquid in said pan;
   a pressure sensor;
   an air pump unit; and
   a controller;
   wherein said air pump unit provides a constant airflow to said tubing; said pressure sensor detecting variations of pressure within said tubing as a level of the liquid in said pan varies, said controller receiving measures of pressure from said pressure sensor and controlling input of liquid into the pan through the inlet of the pan in response to the variations of the level of the liquid in said pan as detected by said pressure sensor as variations of pressure within said tubing.

2. The system of claim 1, wherein said controller controls a valve into one of: i) letting liquid in the pan through said inlet and ii) stopping ingress of liquid in the pan, in response to the variations of the level of the liquid in said pan as detected by said pressure sensor as variations of pressure in said tubing.

3. The system of claim 1, wherein said pressure sensor comprises a pneumatic diaphragm 2-ways valve.

4. The system of claim 1, wherein said air pump unit comprises an air pump and an air flow regulator configured to control and adjust the airflow provided by said air pump to said tubing so as to generate a bubbling rate in a range comprised between 0.3 and 3 bubbles/sec within the liquid in said pan at the open free end of said tubing.

* * * * *